(12) United States Patent
Singh et al.

(10) Patent No.: US 8,347,303 B2
(45) Date of Patent: Jan. 1, 2013

(54) APPARATUS, METHOD, AND SYSTEM TO PROVIDE A MULTI-CORE PROCESSOR FOR AN ELECTRONIC GAMING MACHINE (EGM)

(75) Inventors: Anand Singh, Henderson, NV (US); Pravinkumar Patel, Las Vegas, NV (US); Anthony E. Green, Las Vegas, NV (US); Lawrence McAllister, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1022 days.

(21) Appl. No.: 12/271,337

(22) Filed: Nov. 14, 2008

(65) Prior Publication Data

US 2010/0125851 A1    May 20, 2010

(51) Int. Cl.
*G06F 9/455* (2006.01)
*G06F 9/46* (2006.01)

(52) U.S. Cl. .................................................. 718/104
(58) Field of Classification Search .................. None
See application file for complete search history.

(56) References Cited

U.S. PATENT DOCUMENTS

| | | | |
|---|---|---|---|
| 4,339,798 A | 7/1982 | Hedges et al. | 364/412 |
| 4,373,726 A | 2/1983 | Churchill et al. | 273/138 A |
| 4,592,377 A | 6/1986 | Paulsen et al. | 133/5 R |
| 4,725,079 A | 2/1988 | Koza et al. | 283/73 |
| 4,832,341 A | 5/1989 | Muller et al. | 273/139 |
| 4,948,138 A | 8/1990 | Pease et al. | 273/138 A |
| 5,083,800 A | 1/1992 | Lockton | 273/439 |
| 5,179,517 A | 1/1993 | Sarbin et al. | 364/410 |
| 5,199,710 A | 4/1993 | Lamle | 273/149 R |
| 5,258,837 A | 11/1993 | Gormley | 358/140 |
| 5,275,400 A | 1/1994 | Weingardt et al. | 273/85 CP |
| 5,321,241 A | 6/1994 | Craine | 235/380 |
| 5,324,035 A | 6/1994 | Morris et al. | 273/138 A |
| 5,326,104 A | 7/1994 | Pease et al. | 273/138 A |
| 5,386,103 A | 1/1995 | DeBan et al. | 235/379 |

(Continued)

FOREIGN PATENT DOCUMENTS

DE    19940954 A1    3/2001

(Continued)

OTHER PUBLICATIONS

Bally Technologies, Inc., iVIEW, http://ballytech.com/systems/product.cfm?id=9, download date Nov. 6, 2007, 2 pages.

(Continued)

Primary Examiner — Corey S Faherty
(74) Attorney, Agent, or Firm — Seed IP Law Group PLLC

(57) ABSTRACT

An electronic gaming machine (EGM) implements a multi-core processor. A first of the processor cores is adapted to perform or otherwise control a first set of operations. The first set of operations can include, for example, game manager operations and other operations of the EGM that are more time-sensitive. A second one of the processor cores is adapted to perform or otherwise control a second set of operations. The second set of operations can include, for example, operations related to multimedia presentation associated with the running/playing of a game and/or other operations of the EGM that are not time-sensitive or are otherwise less time-sensitive than the operations performed/controlled by the first processor core. Each of the processor cores may run an operating system that matches the needs of its respective processor core.

13 Claims, 4 Drawing Sheets

U.S. PATENT DOCUMENTS

| | | | |
|---|---|---|---|
| 5,398,932 A | 3/1995 | Eberhardt et al. | 273/138 A |
| 5,472,194 A | 12/1995 | Breeding et al. | 273/138 A |
| 5,493,613 A | 2/1996 | Denno et al. | 380/24 |
| 5,505,449 A | 4/1996 | Eberhardt et al. | 273/138 A |
| 5,507,489 A | 4/1996 | Reibel et al. | 273/138 A |
| 5,562,284 A | 10/1996 | Stevens | 273/139 |
| 5,580,311 A | 12/1996 | Haste, III | 463/29 |
| 5,605,334 A | 2/1997 | McCrea, Jr. | 273/309 |
| 5,605,506 A | 2/1997 | Hoorn et al. | 463/47 |
| 5,613,680 A | 3/1997 | Groves et al. | 273/138.2 |
| 5,613,912 A | 3/1997 | Slater | 463/25 |
| 5,643,086 A | 7/1997 | Alcorn et al. | 463/29 |
| 5,655,961 A | 8/1997 | Acres et al. | 463/27 |
| 5,707,287 A | 1/1998 | McCrea, Jr. | 463/27 |
| 5,737,418 A | 4/1998 | Saffari et al. | 380/9 |
| 5,741,183 A | 4/1998 | Acres et al. | 463/42 |
| 5,745,110 A | 4/1998 | Ertemalp | 345/340 |
| 5,759,102 A | 6/1998 | Pease et al. | 463/42 |
| 5,770,533 A | 6/1998 | Franchi | 463/42 |
| 5,779,545 A | 7/1998 | Berg et al. | 463/22 |
| 5,800,268 A | 9/1998 | Molnick | 463/40 |
| 5,813,912 A | 9/1998 | Shultz | 463/25 |
| 5,823,534 A | 10/1998 | Banyai | 273/269 |
| 5,823,879 A | 10/1998 | Goldberg et al. | 463/42 |
| 5,830,067 A | 11/1998 | Graves et al. | 463/40 |
| 5,830,068 A | 11/1998 | Brenner et al. | 463/42 |
| 5,850,447 A | 12/1998 | Peyret | 380/25 |
| 5,851,149 A | 12/1998 | Xidos et al. | 463/42 |
| 5,890,963 A | 4/1999 | Yen | 463/42 |
| 5,911,626 A | 6/1999 | McCrea, Jr. | 463/27 |
| 5,957,776 A | 9/1999 | Hoehne | 463/29 |
| 5,971,851 A | 10/1999 | Pascal et al. | 463/24 |
| 5,999,808 A | 12/1999 | LaDue | 455/412 |
| 6,001,016 A | 12/1999 | Walker et al. | 463/42 |
| 6,042,150 A | 3/2000 | Daley | 283/86 |
| 6,068,553 A | 5/2000 | Parker | 463/27 |
| 6,077,161 A | 6/2000 | Wisler | 463/11 |
| 6,080,063 A | 6/2000 | Khosla | 463/42 |
| 6,089,980 A | 7/2000 | Gauselmann | 463/27 |
| 6,093,103 A | 7/2000 | McCrea, Jr. | 463/27 |
| 6,102,799 A | 8/2000 | Stupak | 463/27 |
| 6,104,815 A | 8/2000 | Alcorn et al. | 380/251 |
| 6,106,396 A | 8/2000 | Alcorn et al. | 463/29 |
| 6,110,041 A | 8/2000 | Walker et al. | 463/20 |
| 6,110,043 A | 8/2000 | Olsen | 463/27 |
| 6,117,012 A | 9/2000 | McCrea, Jr. | 463/27 |
| 6,135,887 A | 10/2000 | Pease et al. | 463/42 |
| 6,146,273 A | 11/2000 | Olsen | 463/27 |
| 6,149,522 A | 11/2000 | Alcorn et al. | 463/29 |
| 6,152,824 A | 11/2000 | Rothschild et al. | 463/42 |
| 6,165,069 A | 12/2000 | Sines et al. | 463/12 |
| 6,166,763 A | 12/2000 | Rhodes et al. | 348/143 |
| 6,168,523 B1 | 1/2001 | Piechowiak et al. | 463/26 |
| 6,183,366 B1 | 2/2001 | Goldberg et al. | 463/42 |
| 6,186,892 B1 | 2/2001 | Frank et al. | 463/19 |
| 6,210,277 B1 | 4/2001 | Stefan | 463/27 |
| 6,217,447 B1 | 4/2001 | Lofink et al. | 463/12 |
| 6,219,836 B1 | 4/2001 | Wells et al. | 717/11 |
| 6,234,898 B1 | 5/2001 | Belamant et al. | 463/25 |
| 6,244,958 B1 | 6/2001 | Acres | 463/26 |
| 6,251,014 B1 | 6/2001 | Stockdale et al. | 463/16 |
| 6,254,484 B1 | 7/2001 | McCrea, Jr. | 463/27 |
| 6,264,561 B1 | 7/2001 | Saffari et al. | 463/42 |
| 6,275,586 B1 | 8/2001 | Kelly | 380/46 |
| 6,287,202 B1 | 9/2001 | Pascal et al. | 463/42 |
| 6,302,793 B1 | 10/2001 | Fertitta, III et al. | 463/25 |
| 6,312,332 B1 | 11/2001 | Walker et al. | 463/23 |
| 6,346,044 B1 | 2/2002 | McCrea, Jr. | 463/27 |
| 6,383,076 B1 | 5/2002 | Tiedeken | 463/40 |
| 6,394,900 B1 | 5/2002 | McGlone et al. | 463/20 |
| 6,400,272 B1 | 6/2002 | Holtzman et al. | 340/572.1 |
| 6,409,602 B1 | 6/2002 | Wiltshire et al. | 463/42 |
| 6,439,996 B2 | 8/2002 | LeMay et al. | 463/29 |
| 6,443,839 B2 | 9/2002 | Stockdale et al. | 463/16 |
| 6,460,848 B1 | 10/2002 | Soltys et al. | 273/149 R |
| 6,464,584 B2 | 10/2002 | Oliver | 463/25 |
| 6,488,581 B1 | 12/2002 | Stockdale | 463/29 |
| 6,488,585 B1 | 12/2002 | Wells et al. | 463/43 |
| 6,503,147 B1 | 1/2003 | Stockdale et al. | 463/29 |
| 6,505,772 B1 | 1/2003 | Mollett et al. | 235/379 |
| 6,508,709 B1 | 1/2003 | Karmarkar | 463/42 |
| 6,508,710 B1 | 1/2003 | Paravia et al. | 463/42 |
| 6,517,435 B2 | 2/2003 | Soltys et al. | 463/25 |
| 6,517,436 B2 | 2/2003 | Soltys et al. | 463/29 |
| 6,520,857 B2 | 2/2003 | Soltys et al. | 463/29 |
| 6,527,271 B2 | 3/2003 | Soltys et al. | 273/148 R |
| 6,527,638 B1 | 3/2003 | Walker et al. | 463/25 |
| 6,530,836 B2 | 3/2003 | Soltys et al. | 463/29 |
| 6,530,837 B2 | 3/2003 | Soltys et al. | 463/29 |
| 6,533,276 B2 | 3/2003 | Soltys et al. | 273/148 R |
| 6,533,662 B2 | 3/2003 | Soltys et al. | 463/25 |
| 6,575,833 B1 | 6/2003 | Stockdale | 463/29 |
| 6,578,847 B1 | 6/2003 | Hedrick et al. | 273/138.2 |
| 6,579,180 B2 | 6/2003 | Soltys et al. | 463/25 |
| 6,579,181 B2 | 6/2003 | Soltys et al. | 463/25 |
| 6,581,747 B1 | 6/2003 | Charlier et al. | 194/214 |
| 6,595,857 B2 | 7/2003 | Soltys et al. | 463/29 |
| 6,607,441 B1 | 8/2003 | Acres | 463/25 |
| 6,609,978 B1 | 8/2003 | Paulsen | 463/42 |
| 6,612,928 B1 | 9/2003 | Bradford et al. | 463/29 |
| 6,629,184 B1 | 9/2003 | Berg et al. | 710/306 |
| 6,638,170 B1 | 10/2003 | Crumby | 463/42 |
| 6,641,484 B2 | 11/2003 | Oles et al. | 463/47 |
| 6,645,077 B2 | 11/2003 | Rowe | 463/42 |
| 6,652,378 B2 | 11/2003 | Cannon et al. | 463/20 |
| 6,656,048 B2 | 12/2003 | Olsen | 463/25 |
| 6,663,490 B2 | 12/2003 | Soltys et al. | 463/25 |
| 6,675,152 B1 | 1/2004 | Prasad et al. | 705/64 |
| 6,676,522 B2 | 1/2004 | Rowe et al. | 463/42 |
| 6,682,421 B1 | 1/2004 | Rowe et al. | 463/25 |
| 6,682,423 B2 | 1/2004 | Brosnan et al. | 463/29 |
| 6,685,564 B2 | 2/2004 | Oliver | 463/25 |
| 6,685,567 B2 | 2/2004 | Cockerille et al. | 463/43 |
| 6,688,979 B2 | 2/2004 | Soltys et al. | 463/25 |
| 6,699,128 B1 | 3/2004 | Beadell et al. | 463/46 |
| 6,702,291 B2 | 3/2004 | Grebler et al. | 273/292 |
| 6,712,695 B2 | 3/2004 | Mothwurf et al. | 463/25 |
| 6,712,696 B2 | 3/2004 | Soltys et al. | 463/25 |
| 6,718,361 B1 | 4/2004 | Basani et al. | 709/201 |
| 6,728,740 B2 | 4/2004 | Kelly et al. | 708/250 |
| 6,743,102 B1 | 6/2004 | Fiechter et al. | 463/42 |
| 6,745,330 B1 | 6/2004 | Maillot | 713/200 |
| 6,746,330 B2 | 6/2004 | Cannon | 463/25 |
| 6,752,312 B1 | 6/2004 | Chamberlain et al. | 235/375 |
| 6,755,741 B1 | 6/2004 | Rafaeli | 463/25 |
| 6,758,751 B2 | 7/2004 | Soltys et al. | 463/29 |
| 6,800,029 B2 | 10/2004 | Rowe et al. | 463/25 |
| 6,811,488 B2 | 11/2004 | Paravia et al. | 463/42 |
| 6,817,948 B2 | 11/2004 | Pascal et al. | 463/42 |
| 6,823,419 B2 | 11/2004 | Berg et al. | 710/306 |
| 6,837,789 B2 | 1/2005 | Garahi et al. | 463/29 |
| 6,846,238 B2 | 1/2005 | Wells | 463/39 |
| 6,848,994 B1 | 2/2005 | Knust et al. | 463/25 |
| 6,866,581 B2 | 3/2005 | Martinek et al. | 463/16 |
| 6,866,586 B2 | 3/2005 | Oberberger et al. | 463/42 |
| 6,884,173 B2 | 4/2005 | Gauselmann | 463/42 |
| 6,884,174 B2 | 4/2005 | Lundy et al. | 463/42 |
| 6,896,618 B2 | 5/2005 | Benoy et al. | 463/25 |
| 6,899,627 B2 | 5/2005 | Lam et al. | 463/40 |
| 6,905,411 B2 | 6/2005 | Nguyen et al. | 463/25 |
| 6,908,387 B2 | 6/2005 | Hedrick et al. | 463/31 |
| 6,962,530 B2 | 11/2005 | Jackson | 463/29 |
| 6,971,956 B2 | 12/2005 | Rowe et al. | 463/25 |
| 6,972,682 B2 | 12/2005 | Lareau et al. | 340/568.1 |
| 6,993,587 B1 | 1/2006 | Basani et al. | 709/229 |
| 6,997,803 B2 | 2/2006 | LeMay et al. | 463/20 |
| 7,025,674 B2 | 4/2006 | Adams et al. | 463/1 |
| 7,035,626 B1 | 4/2006 | Luciano, Jr. | 455/414.1 |
| 7,050,056 B2 | 5/2006 | Meyringer | 345/440 |
| 7,062,470 B2 | 6/2006 | Prasad et al. | 705/64 |
| 7,086,947 B2 | 8/2006 | Walker et al. | 463/25 |
| 7,099,035 B2 | 8/2006 | Brooks et al. | 358/1.15 |
| 7,112,138 B2 | 9/2006 | Hedrick et al. | 463/29 |
| 7,114,718 B2 | 10/2006 | Grauzer et al. | 273/149 R |
| 7,116,782 B2 | 10/2006 | Jackson et al. | 380/251 |
| 7,147,558 B2 | 12/2006 | Giobbi | 463/25 |
| 7,168,089 B2 | 1/2007 | Nguyen et al. | 726/4 |

| Patent Number | Date | Inventor | Class |
|---|---|---|---|
| 7,179,170 B2 | 2/2007 | Martinek et al. | 463/29 |
| 7,186,181 B2 | 3/2007 | Rowe | 463/42 |
| 7,197,765 B2 | 3/2007 | Chan et al. | 726/8 |
| 7,198,571 B2 | 4/2007 | LeMay et al. | 463/25 |
| RE39,644 E | 5/2007 | Alcorn et al. | 380/251 |
| 7,291,068 B2 | 11/2007 | Bryant et al. | 463/25 |
| 7,303,475 B2 | 12/2007 | Britt et al. | 463/42 |
| 7,309,065 B2 | 12/2007 | Yoseloff et al. | 273/292 |
| 7,311,605 B2 | 12/2007 | Moser | 463/25 |
| 7,329,185 B2 | 2/2008 | Conover et al. | 463/25 |
| 7,330,822 B1 | 2/2008 | Robson et al. | 705/9 |
| 7,331,520 B2 | 2/2008 | Silva et al. | 235/381 |
| 7,346,682 B2 | 3/2008 | Basani et al. | 709/224 |
| 7,349,920 B1 | 3/2008 | Feinberg et al. | 707/102 |
| 7,351,147 B2 | 4/2008 | Stockdale et al. | 463/29 |
| 7,356,770 B1 | 4/2008 | Jackson | 715/736 |
| 7,363,342 B1 | 4/2008 | Wang et al. | 709/204 |
| 7,364,510 B2 | 4/2008 | Walker et al. | 463/42 |
| 7,370,282 B2 | 5/2008 | Cary | 715/772 |
| 7,384,339 B2 | 6/2008 | LeMay et al. | 463/30 |
| 7,398,327 B2 | 7/2008 | Lee | 709/250 |
| 7,410,422 B2 | 8/2008 | Fine | 463/42 |
| 7,419,428 B2 | 9/2008 | Rowe | 463/25 |
| 7,427,233 B2 | 9/2008 | Walker et al. | 463/16 |
| 7,427,236 B2 | 9/2008 | Kaminkow et al. | 463/42 |
| 7,434,805 B2 | 10/2008 | Grauzer et al. | 273/149 R |
| 7,435,179 B1 | 10/2008 | Ford | 463/42 |
| 7,438,643 B2 | 10/2008 | Brosnan et al. | 463/42 |
| 7,455,591 B2 | 11/2008 | Nguyen | 463/42 |
| 7,460,863 B2 | 12/2008 | Steelberg et al. | 455/419 |
| 7,465,231 B2 | 12/2008 | Lewin et al. | 463/37 |
| 7,473,178 B2 | 1/2009 | Boyd et al. | 463/25 |
| 7,483,394 B2 | 1/2009 | Chang et al. | 370/254 |
| 7,500,915 B2 | 3/2009 | Wolf et al. | 463/27 |
| 7,510,474 B2 | 3/2009 | Carter, Sr. | 463/29 |
| 7,515,718 B2 | 4/2009 | Nguyen et al. | 380/278 |
| 7,534,169 B2 | 5/2009 | Amaitis et al. | 463/39 |
| 7,549,576 B2 | 6/2009 | Alderucci et al. | 235/380 |
| 7,559,080 B2 | 7/2009 | Bhargavan et al. | 726/1 |
| 7,566,274 B2 | 7/2009 | Johnson et al. | 463/42 |
| 7,575,234 B2 | 8/2009 | Soltys et al. | 273/149 R |
| 7,577,847 B2 | 8/2009 | Nguyen et al. | 713/186 |
| 7,578,739 B2 | 8/2009 | Gauselmann | 463/27 |
| 7,581,256 B2 | 8/2009 | Cockerille et al. | 726/30 |
| 7,585,217 B2 | 9/2009 | Lutnick et al. | 463/16 |
| 7,611,407 B1 | 11/2009 | Itkis et al. | 463/29 |
| 7,611,409 B2 | 11/2009 | Muir et al. | 463/29 |
| 7,617,151 B2 | 11/2009 | Rowe | 705/39 |
| 7,618,317 B2 | 11/2009 | Jackson | 463/24 |
| 7,629,886 B2 | 12/2009 | Steeves | 340/572.1 |
| 7,634,550 B2 | 12/2009 | Wolber et al. | 709/220 |
| 7,637,810 B2 | 12/2009 | Amaitis et al. | 463/25 |
| 7,644,861 B2 | 1/2010 | Alderucci et al. | 235/382 |
| 7,648,414 B2 | 1/2010 | McNutt et al. | 463/25 |
| 7,682,249 B2 | 3/2010 | Winans et al. | 463/31 |
| 7,684,874 B2 | 3/2010 | Schlottmann et al. | 700/9 |
| 7,685,593 B2 | 3/2010 | Solomon et al. | 717/170 |
| 7,686,688 B2 | 3/2010 | Friedman et al. | 463/25 |
| 7,690,995 B2 | 4/2010 | Frankulin et al. | 463/41 |
| 7,699,697 B2 | 4/2010 | Darrah et al. | 463/16 |
| 7,699,703 B2 | 4/2010 | Muir et al. | 463/29 |
| 7,722,453 B2 | 5/2010 | Lark et al. | 463/16 |
| 7,730,198 B2 | 6/2010 | Ruppert et al. | 709/230 |
| 7,744,462 B2 | 6/2010 | Grav et al. | 463/27 |
| 7,747,741 B2 | 6/2010 | Basani et al. | 709/224 |
| 7,753,790 B2 | 7/2010 | Nguyen et al. | 463/42 |
| 7,769,877 B2 | 8/2010 | McBride et al. | 463/29 |
| 7,778,635 B2 | 8/2010 | Crookham et al. | 455/426.1 |
| 7,780,525 B2 | 8/2010 | Walker et al. | 463/29 |
| 7,780,526 B2 | 8/2010 | Nguyen et al. | 463/29 |
| 7,780,529 B2 | 8/2010 | Rowe et al. | 463/42 |
| 7,783,881 B2 | 8/2010 | Morrow et al. | 713/165 |
| 7,785,204 B2 | 8/2010 | Wells et al. | 463/42 |
| 7,824,267 B2 | 11/2010 | Cannon et al. | 463/42 |
| 7,828,649 B2 | 11/2010 | Cuddy et al. | 463/26 |
| 7,841,946 B2 | 11/2010 | Walker et al. | 463/42 |
| 7,846,020 B2 | 12/2010 | Walker et al. | 463/29 |
| 7,850,528 B2 | 12/2010 | Wells | 463/42 |
| 7,862,425 B2 | 1/2011 | Cavagna | 463/25 |
| 7,867,081 B2 | 1/2011 | Schneider et al. | 463/25 |
| 7,874,920 B2 | 1/2011 | Hornik et al. | 463/42 |
| 7,874,921 B2 | 1/2011 | Baszucki et al. | 463/43 |
| 7,898,679 B2 | 3/2011 | Brack et al. | 358/1.15 |
| 7,901,294 B2 | 3/2011 | Walker et al. | 463/42 |
| 7,905,780 B2 | 3/2011 | Morrow et al. | 463/31 |
| 7,931,533 B2 | 4/2011 | LeMay et al. | 463/29 |
| 7,937,464 B2 | 5/2011 | Ruppert et al. | 709/224 |
| 2001/0019966 A1 | 9/2001 | Idaka | 463/40 |
| 2002/0111213 A1 | 8/2002 | McEntee et al. | 463/42 |
| 2002/0113371 A1 | 8/2002 | Snow | 273/292 |
| 2002/0115487 A1 | 8/2002 | Wells | 463/42 |
| 2002/0142844 A1 | 10/2002 | Kerr | 463/42 |
| 2003/0004871 A1 | 1/2003 | Rowe | 705/39 |
| 2003/0032474 A1 | 2/2003 | Kaminkow | 463/25 |
| 2003/0042679 A1 | 3/2003 | Snow | 273/292 |
| 2003/0064798 A1 | 4/2003 | Grauzer et al. | 463/29 |
| 2003/0075869 A1 | 4/2003 | Breeding et al. | 273/292 |
| 2003/0090064 A1 | 5/2003 | Hoyt et al. | 273/292 |
| 2003/0104865 A1 | 6/2003 | Itkis et al. | 463/39 |
| 2003/0130024 A1 | 7/2003 | Darby | 463/13 |
| 2003/0203755 A1 | 10/2003 | Jackson | 463/42 |
| 2003/0206548 A1 | 11/2003 | Bannai et al. | 370/389 |
| 2003/0224858 A1 | 12/2003 | Yoseloff et al. | 463/43 |
| 2003/0232651 A1 | 12/2003 | Huard et al. | 463/42 |
| 2004/0002386 A1 | 1/2004 | Wolfe et al. | 463/42 |
| 2004/0002388 A1 | 1/2004 | Larsen et al. | 463/43 |
| 2004/0029635 A1 | 2/2004 | Giobbi | 463/30 |
| 2004/0043815 A1 | 3/2004 | Kaminkow | 463/25 |
| 2004/0043820 A1 | 3/2004 | Schlottmann | 463/43 |
| 2004/0048671 A1 | 3/2004 | Rowe | 463/42 |
| 2004/0082385 A1 | 4/2004 | Silva et al. | 463/40 |
| 2004/0092310 A1 | 5/2004 | Brosnan et al. | 463/42 |
| 2004/0106452 A1 | 6/2004 | Nguyen et al. | 463/42 |
| 2004/0110119 A1 | 6/2004 | Riconda et al. | 434/350 |
| 2004/0127291 A1 | 7/2004 | George et al. | 463/42 |
| 2004/0133485 A1 | 7/2004 | Schoonmaker et al. | 705/30 |
| 2004/0142744 A1 | 7/2004 | Atkinson et al. | 463/29 |
| 2004/0166940 A1 | 8/2004 | Rothschild | 463/42 |
| 2004/0185936 A1 | 9/2004 | Block et al. | 463/42 |
| 2005/0043094 A1 | 2/2005 | Nguyen et al. | 463/42 |
| 2005/0054438 A1 | 3/2005 | Rothschild et al. | 463/29 |
| 2005/0054445 A1 | 3/2005 | Gatto et al. | 463/42 |
| 2005/0070358 A1 | 3/2005 | Angell et al. | 463/39 |
| 2005/0101383 A1* | 5/2005 | Wells | 463/39 |
| 2005/0119052 A1 | 6/2005 | Russell et al. | 463/42 |
| 2005/0153778 A1 | 7/2005 | Nelson et al. | 463/42 |
| 2005/0222891 A1 | 10/2005 | Chan et al. | 705/9 |
| 2005/0239542 A1 | 10/2005 | Olsen | 463/27 |
| 2005/0282626 A1 | 12/2005 | Manfredi et al. | 463/25 |
| 2006/0004618 A1 | 1/2006 | Brixius | 705/8 |
| 2006/0009282 A1 | 1/2006 | George et al. | 463/29 |
| 2006/0015716 A1 | 1/2006 | Thornton et al. | 713/155 |
| 2006/0026499 A1 | 2/2006 | Weddle | 715/503 |
| 2006/0035707 A1 | 2/2006 | Nguyen et al. | 463/29 |
| 2006/0046849 A1 | 3/2006 | Kovacs | 463/39 |
| 2006/0116208 A1 | 6/2006 | Chen et al. | 463/43 |
| 2006/0121970 A1 | 6/2006 | Khal | 463/16 |
| 2006/0183541 A1 | 8/2006 | Okada et al. | 463/29 |
| 2006/0195847 A1 | 8/2006 | Amano et al. | 718/103 |
| 2006/0205508 A1 | 9/2006 | Green | 463/40 |
| 2006/0247026 A1 | 11/2006 | Walker et al. | 463/20 |
| 2006/0247057 A1 | 11/2006 | Green et al. | 463/42 |
| 2006/0248161 A1 | 11/2006 | O'Brien et al. | 709/217 |
| 2006/0277487 A1 | 12/2006 | Poulsen et al. | 715/772 |
| 2007/0004501 A1* | 1/2007 | Brewer et al. | 463/25 |
| 2007/0015583 A1 | 1/2007 | Tran | 463/40 |
| 2007/0026935 A1 | 2/2007 | Wolf et al. | 463/25 |
| 2007/0033247 A1 | 2/2007 | Martin | 709/201 |
| 2007/0054740 A1 | 3/2007 | Salls et al. | 463/42 |
| 2007/0057453 A1 | 3/2007 | Soltys et al. | 273/149 P |
| 2007/0057454 A1 | 3/2007 | Fleckenstein | 273/149 R |
| 2007/0057469 A1 | 3/2007 | Grauzer et al. | 273/309 |
| 2007/0060259 A1 | 3/2007 | Pececnik | 463/16 |
| 2007/0060307 A1 | 3/2007 | Mathis et al. | 463/25 |
| 2007/0060365 A1 | 3/2007 | Tien et al. | 463/42 |
| 2007/0077995 A1 | 4/2007 | Oak et al. | 463/42 |
| 2007/0093298 A1 | 4/2007 | Brunet | 463/42 |
| 2007/0105628 A1 | 5/2007 | Arbogast et al. | 463/42 |

| | | | |
|---|---|---|---|
| 2007/0111775 A1 | 5/2007 | Yoseloff | 463/16 |
| 2007/0111791 A1 | 5/2007 | Arbogast et al. | 463/40 |
| 2007/0111794 A1 | 5/2007 | Hogan et al. | 463/42 |
| 2007/0117608 A1 | 5/2007 | Roper et al. | 463/16 |
| 2007/0124483 A1 | 5/2007 | Marples et al. | 709/228 |
| 2007/0129145 A1 | 6/2007 | Blackburn et al. | 463/42 |
| 2007/0150329 A1 | 6/2007 | Brook et al. | 705/8 |
| 2007/0167235 A1 | 7/2007 | Naicker | 463/42 |
| 2007/0191102 A1 | 8/2007 | Coliz et al. | 463/42 |
| 2007/0192748 A1 | 8/2007 | Martin et al. | 715/856 |
| 2007/0198418 A1 | 8/2007 | MacDonald et al. | 705/52 |
| 2007/0208816 A1 | 9/2007 | Baldwin et al. | 709/206 |
| 2007/0218998 A1 | 9/2007 | Arbogast et al. | 463/42 |
| 2007/0235521 A1 | 10/2007 | Mateen et al. | 235/379 |
| 2007/0241497 A1 | 10/2007 | Soltys et al. | 273/149 R |
| 2007/0241498 A1 | 10/2007 | Soltys | 273/149 R |
| 2007/0243925 A1 | 10/2007 | LeMay et al. | 463/20 |
| 2007/0243927 A1 | 10/2007 | Soltys | 463/25 |
| 2007/0243935 A1 | 10/2007 | Huizinga | 463/42 |
| 2007/0259709 A1 | 11/2007 | Kelly et al. | 463/20 |
| 2007/0259711 A1 | 11/2007 | Thomas | 463/22 |
| 2007/0287535 A1 | 12/2007 | Soltys | 463/29 |
| 2007/0298868 A1 | 12/2007 | Soltys | 463/25 |
| 2008/0004108 A1 | 1/2008 | Klinkhammer | 463/29 |
| 2008/0009344 A1 | 1/2008 | Graham et al. | 463/25 |
| 2008/0026832 A1 | 1/2008 | Stevens et al. | 463/26 |
| 2008/0026848 A1 | 1/2008 | Byng | 463/42 |
| 2008/0038035 A1 | 2/2008 | Shuldman et al. | 400/76 |
| 2008/0045341 A1 | 2/2008 | Englman | 463/42 |
| 2008/0064501 A1 | 3/2008 | Patel | 463/40 |
| 2008/0076572 A1 | 3/2008 | Nguyen et al. | 463/42 |
| 2008/0090651 A1 | 4/2008 | Baerlocher | 463/27 |
| 2008/0096659 A1 | 4/2008 | Kreloff et al. | 463/39 |
| 2008/0108433 A1 | 5/2008 | DiMichele et al. | 463/40 |
| 2008/0113764 A1 | 5/2008 | Soltys | 463/22 |
| 2008/0113773 A1 | 5/2008 | Johnson et al. | 463/25 |
| 2008/0119284 A1 | 5/2008 | Luciano, Jr. et al. | 463/42 |
| 2008/0146337 A1 | 6/2008 | Halonen et al. | 463/42 |
| 2008/0153599 A1 | 6/2008 | Atashband et al. | 463/42 |
| 2008/0153600 A1 | 6/2008 | Swarna | 463/43 |
| 2008/0154916 A1 | 6/2008 | Atashband | 707/10 |
| 2008/0155665 A1 | 6/2008 | Ruppert et al. | 726/5 |
| 2008/0162729 A1 | 7/2008 | Ruppert | 709/249 |
| 2008/0171588 A1 | 7/2008 | Atashband | 463/20 |
| 2008/0171598 A1 | 7/2008 | Deng | 463/40 |
| 2008/0200255 A1 | 8/2008 | Eisele | 463/42 |
| 2008/0243697 A1 | 10/2008 | Irving et al. | 705/54 |
| 2008/0261701 A1 | 10/2008 | Lewin et al. | 463/42 |
| 2008/0287197 A1 | 11/2008 | Ruppert et al. | 463/42 |
| 2008/0293494 A1 | 11/2008 | Adiraju et al. | 463/42 |
| 2008/0311971 A1 | 12/2008 | Dean | 463/20 |
| 2008/0318685 A9 | 12/2008 | Oak et al. | 463/42 |
| 2009/0005176 A1 | 1/2009 | Morrow et al. | 463/43 |
| 2009/0011833 A1 | 1/2009 | Seelig et al. | 463/42 |
| 2009/0029775 A1 | 1/2009 | Ruppert et al. | 463/42 |
| 2009/0031008 A1 | 1/2009 | Elliott et al. | 709/220 |
| 2009/0115133 A1 | 5/2009 | Kelly et al. | 273/274 |
| 2009/0117994 A1 | 5/2009 | Kelly et al. | 463/25 |
| 2009/0118001 A1 | 5/2009 | Kelly et al. | 463/29 |
| 2009/0118005 A1 | 5/2009 | Kelly et al. | 463/31 |
| 2009/0118006 A1 | 5/2009 | Kelly et al. | 463/31 |
| 2009/0124392 A1 | 5/2009 | Ruppert et al. | 463/42 |
| 2009/0124394 A1 | 5/2009 | Swarna | 463/43 |
| 2009/0125603 A1 | 5/2009 | Atashband et al. | 709/207 |
| 2009/0131144 A1 | 5/2009 | Allen | 463/20 |
| 2009/0131163 A1 | 5/2009 | Arbogast et al. | 463/29 |
| 2009/0132720 A1 | 5/2009 | Ruppert et al. | 709/231 |
| 2009/0170594 A1 | 7/2009 | Delaney et al. | 463/25 |
| 2009/0176556 A1 | 7/2009 | Gagner et al. | 463/25 |
| 2009/0176580 A1 | 7/2009 | Herrmann et al. | 463/43 |
| 2009/0181776 A1 | 7/2009 | Deng | 463/42 |
| 2009/0253483 A1 | 10/2009 | Pacey et al. | 463/20 |
| 2009/0270170 A1 | 10/2009 | Patton | 463/36 |
| 2009/0275394 A1 | 11/2009 | Young et al. | 463/25 |
| 2009/0275400 A1 | 11/2009 | Rehm et al. | 463/27 |
| 2009/0275401 A1 | 11/2009 | Allen et al. | 463/29 |
| 2009/0275402 A1 | 11/2009 | Backover et al. | 463/29 |
| 2009/0276341 A1 | 11/2009 | McMahan et al. | 705/30 |
| 2009/0298583 A1 | 12/2009 | Jones | 463/29 |
| 2009/0307069 A1 | 12/2009 | Meyerhofer | 705/14.12 |
| 2010/0016067 A1 | 1/2010 | White et al. | 463/25 |
| 2010/0016068 A1 | 1/2010 | White et al. | 463/25 |
| 2010/0029385 A1 | 2/2010 | Garvey et al. | 463/35 |
| 2010/0048291 A1 | 2/2010 | Warkentin | 463/25 |
| 2010/0093441 A1 | 4/2010 | Rajaraman et al. | 463/42 |
| 2010/0124990 A1 | 5/2010 | Crowder | 463/42 |
| 2010/0125851 A1 | 5/2010 | Singh et al. | 718/104 |
| 2010/0130280 A1 | 5/2010 | Arezina et al. | 463/20 |
| 2010/0131772 A1 | 5/2010 | Atashband et al. | 713/189 |
| 2010/0151926 A1 | 6/2010 | Ruppert et al. | 463/1 |
| 2010/0161798 A1 | 6/2010 | Ruppert et al. | 709/225 |
| 2010/0234104 A1 | 9/2010 | Ruppert et al. | 463/30 |
| 2010/0248842 A1 | 9/2010 | Ruppert | 463/42 |
| 2011/0009184 A1 | 1/2011 | Byng | 463/20 |
| 2011/0124417 A1 | 5/2011 | Baynes et al. | 463/43 |

FOREIGN PATENT DOCUMENTS

| | | |
|---|---|---|
| EP | 1074955 A2 | 2/2001 |
| EP | 1463008 A2 | 9/2004 |
| GB | 2380143 A | 4/2003 |
| JP | 8255059 | 10/1996 |
| KR | 2001-0084838 | 9/2001 |
| KR | 2002-0061793 | 7/2002 |
| KR | 2003-0091635 | 12/2003 |
| WO | 02/05914 A1 | 1/2002 |
| WO | 03/060846 A2 | 7/2003 |
| WO | 2005/035084 | 4/2005 |
| WO | 2007/033207 A2 | 3/2007 |

OTHER PUBLICATIONS

Bally TMS, "MP21—Automated Table Tracking/Features," 2 pages, Nov. 2005.
Bally TMS, "MPBacc—Specifications/Specifications," 2 pages, Nov. 2005.
Bally TMS, "MPLite—Table Management System/Features," 2 pages, Nov. 2005.
Bulavsky, J., "Tracking the Tables," *Casino Journal*, May 2004, pp. 44-47, accessed Dec. 21, 2005, URL=http://www.ascendgaming.com/cj/vendors_manufacturers_table/Trackin916200411141AM.htm, 5 pages.
Burke, A., "Tracking the Tables," reprinted from *International Gaming & Wagering Business*, Aug. 2003, 4 pages.
Crowder, Robert, "Apparatus, Method, and System to Provide a Multiple Processor Architecture for Server-Based Gaming," Office Action dated May 5, 2011 for U.S. Appl. No. 12/271,736, 10 Pages.
Crowder, Robert, "Apparatus, Method, and System to Provide a Multiple Processor Architecture for Server-Based Gaming," Amendment dated Aug. 5, 2011 for U.S. Appl. No. 12/271,736, 13 Pages.
Gros, R., "All You Ever Wanted to Know About Table Games," reprinted from *Global Gaming Business*, Aug. 1, 2003, 2 pages.
International Search Report Mailed Dec. 22, 2009 for PCT/US2009/042149, 3 Pages.
Kisenwether, Joseph et al., "Systems, Methods, and Devices for Providing Instances of a Secondary Game," Office Action dated Jun. 28, 2011 for U.S. Appl. No. 12/112,740, 39 Pages.
Kisenwether, Joseph et al., "Systems, Methods, and Devices for Providing Instances of a Secondary Game," Amendment dated Sep. 28, 2011 for U.S. Appl. No. 12/112,740, 14 Pages.
MagTek, "Port Powered Swipe Reader," Technical Reference Manual, Manual Part No. 99875094 Rev 12, Jun. 2003, 20 pages.
Mikohn, "Mikohn Tablelink—The Industry's Premier Table Tracking Solution Delivers Improvements Straight to the Bottom Line," 2 pages, before Jan. 1, 2004.
Terdiman, D., "Who's Holding the Aces Now?", reprinted from *Wired News*, Aug. 18, 2003, 2 pages.
Winkler, C., "Product Spotlight: MindPlay," reprinted from *Gaming and Leisure Technology*, Fall 2003, 2 pages.
Written Opinion Mailed Dec. 22, 2009 for PCT/US2009/042149, 3 Pages.

* cited by examiner

APPARATUS, METHOD, AND SYSTEM TO PROVIDE A MULTI-CORE PROCESSOR FOR AN ELECTRONIC GAMING MACHINE (EGM)

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This disclosure generally relates to gaming devices, and more particularly but not exclusively, relates to electronic gaming machines (EGMs).

2. Description of the Related Art

Gaming properties often devote a large percentage of floor space to gaming devices. Each gaming device presents players with individual games of chance, games of skill, or combinations thereof that they may wager on.

In modern gaming properties, many gaming devices are in the form of electronic gaming machines (EGMs) that may include specialized computing devices or specially programmed general purpose computing devices along with user input and output interfaces and financial transaction components. These EGMs have been subject to ever greater computational demands. Each EGM may provide, inter alia, the following: offer a number of graphics-intensive games of chance and associated bonus games to players; communicate via a network with one or more servers within the gaming property; display the content of one or more web pages; receive and process currency of various types inserted by players; display targeted advertisements and other audiovisual content to players; process and store information indicative of wagers made by players; and so forth. As these computational demands have continued to multiply, the computational power provided in each EGM has needed to be increased in order to enable more and more functionality.

One possible solution to meet these computational demands is to provide larger and faster single processors. However, larger single processors are more expensive, and fewer such processors can be fabricated per wafer. Further, the larger size of the processor increases the risk of defects. A faster and larger single processor also generates increased heat, thereby requiring more complex and/or additional components to address heat dissipation.

BRIEF SUMMARY OF THE INVENTION

An electronic gaming machine (EGM) apparatus may be summarized as including:

at least one processor-readable storage medium that stores: a set of processor-executable game instructions that implement a game; a set of processor-executable game manager instructions that implement a game manager; and a first set of processor-executable operating system instructions that implement a first operating system; and a multi-core processor that includes: a first processor core adapted to execute the game manager instructions and the first set of operating system instructions; and a second processor core adapted to execute the game instructions and adapted to operate independently of the first processor core, the first processor core also being adapted to operate independently of the second processor core.

A method of operating an electronic gaming machine (EGM) having a multi-core processor may be summarized as including: allocating first tasks to be executed by a first processor core of the multi-core processor; allocating second tasks to be executed by at least a second processor core of the multi-core processor, the first tasks being more time-sensitive relative to the second tasks; executing the first tasks by the first processor core; and executing, substantially independently of the execution by the first processor core, the second tasks by the second processor core.

A system may be summarized as including:
an electronic gaming machine (EGM);
a multi-core processor coupled to the EGM and including: a first processor core adapted to execute first tasks of the EGM; at least a second processor core adapted to execute second tasks of the EGM, the first tasks being more time-sensitive relative to the second tasks; and a semiconductor substrate on which the first and second processor cores are formed; and a display coupled to the multi-core processor and to the EGM and adapted to display results of execution by the second processor core.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE EMBODIMENTS OF THE INVENTION

Figure 1:
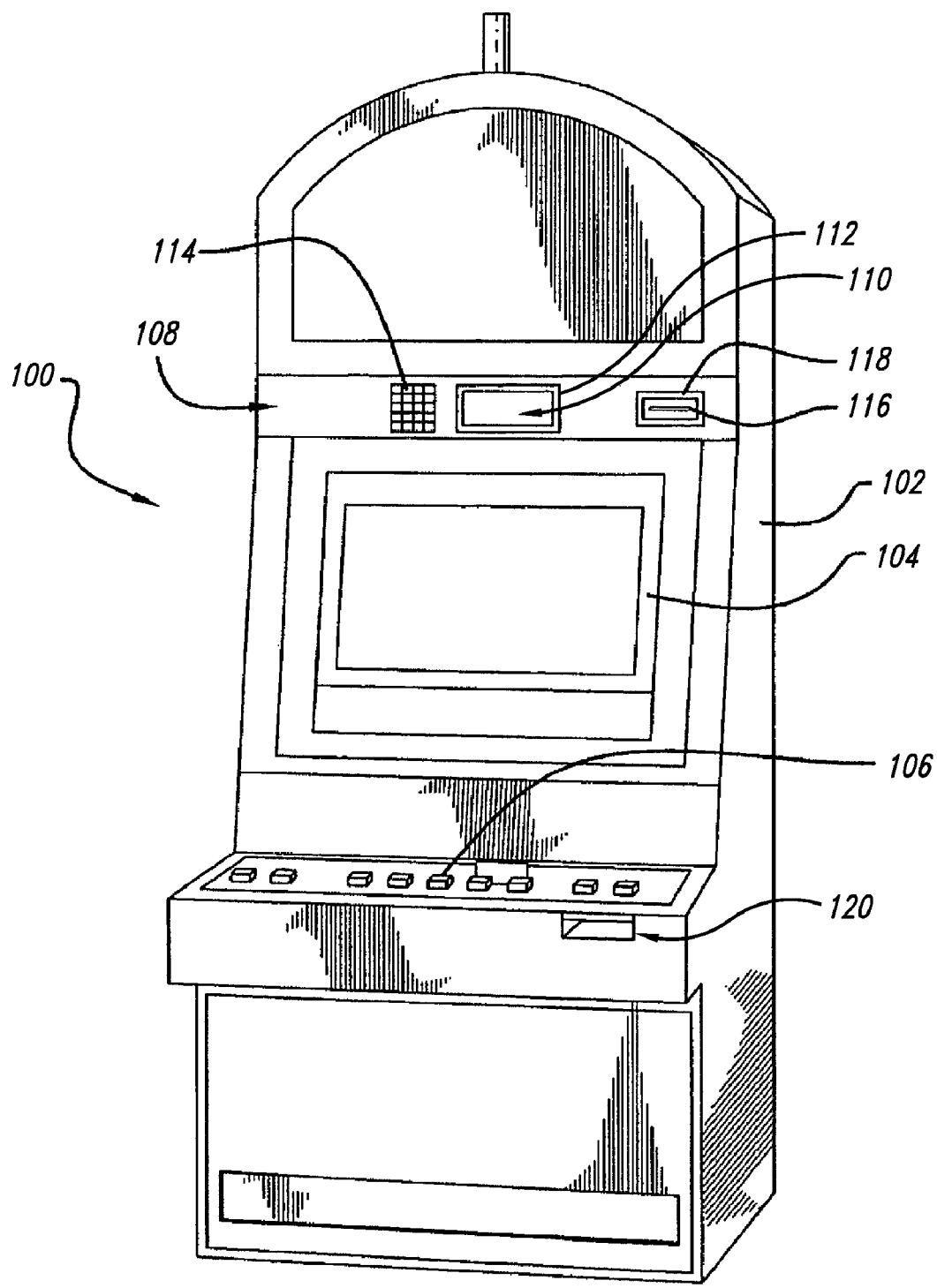
FIG. 1 is a perspective view of an example EGM having a multi-core processor according to one embodiment.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Furthermore, the particular features, structures, or characteristics may be combined in any suitable manner in one or more embodiments.

Unless the context requires otherwise, throughout the specification and claims which follow, the word "comprise" and variations thereof, such as, "comprises" and "comprising" are to be construed in an open, inclusive sense, that is, as "including, but not limited to."

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings provided herein are for convenience only and do not interpret the scope or meaning of the embodiments.

As an overview, one embodiment provides an electronic gaming machine (EGM) that implements a multi-core processor. A first of the processor cores is adapted to perform or otherwise control a first set of operations. The first set of operations can include, for example, game manager operations and other operations of the EGM that are more time-sensitive. A second one of the processor cores is adapted to perform or otherwise control a second set of operations. The second set of operations can include, for example, operations related to multimedia presentation associated with the running/playing of a game and/or other operations of the EGM that are not time-sensitive or are otherwise less time-sensitive than the operations performed/controlled by the first processor core. Each of the processor cores may run an operating system that matches the needs of its respective processor core.

For the sake of simplicity and convenience, embodiments will be described herein in the context of a "multi-core processor" implementation (such as a "dual-core processor" configuration), rather than in the context of a "multi-processor" implementation (such as a "dual-processor" system). Dual-processor (DP) systems, for example, are generally those that contain two separate physical processors in the same chassis. In DP systems, the two processors can either be located on the same motherboard or on separate boards. In comparison, for an example dual-core processor configuration of one embodiment described herein, an integrated circuit (IC) contains two complete processor cores. The two processor cores may be manufactured so that they reside side-by-side on the same die, each with its own path to a system front-side bus. A "multi-core" implementation involves the expansion of a dual-core configuration so as to provide more than two separate processor cores on the same IC.

A multi-core processor is useful in boosting a system's multi-tasking computing power. For example, a dual-core processor provides two complete execution units instead of one, with each execution unit having an independent interface to the front-side bus. Since each processor core has its own cache, the operating system(s) has sufficient resources to handle intensive tasks in parallel, which provides a noticeable improvement to multitasking.

In other embodiments, a multi-processor implementation (such as a DP system) can be provided. Examples of a multi-processor implementation are described in U.S. patent application Ser. No. 12/271,736, entitled "APPARATUS, METHOD, AND SYSTEM TO PROVIDE A MULTIPLE PROCESSOR ARCHITECTURE FOR SERVER-BASED GAMING," assigned to the same assignee as the present application, and incorporated herein by reference in its entirety.

FIG. 1 shows one embodiment of an EGM 100 adapted to run one or more games, and configured with a multi-core processor. As will be described in further detail below, one embodiment associates a first processor core of the multi-core processor with a first operating system and game manager, and associates a game (including multimedia presentation) with a second processor core of the multi-core processor. A second operating system may be associated with the second processor core in order to run the game associated with the second processor core. Thus, in one embodiment, the EGM 100 may execute a plurality of operating systems substantially concurrently, each of which may utilize some of the same and/or different underlying physical hardware.

The EGM 100 may be located within a gaming property (not shown) comprising any of a variety of establishments housing one or more EGMs used for gaming/gambling. In one embodiment, the EGM 100 may be located within a casino. However, places such as convenience stores, hotels, gas stations, supermarkets, or other establishments that are capable of housing the EGM 100 may be considered as gaming property.

The EGM 100 may be adapted to run any one or more of a variety of games of chance, games of skill, or combinations thereof that a player may wager on. Such games may include, but not be limited to, video slot machines, video keno, video poker, video blackjack, Class II bingo, lottery, craps, a mechanical or video representation of a wheel game, etc. In one embodiment, the EGM 100 is a single-offering EGM, enabling play of only one game. However, in other embodiments, the EGM 100 is relatively flexible, allowing a player to choose from among a number of games.

In the illustrated embodiment, the exterior of the EGM 100 may be defined by a housing 102. The housing 102 may be a self-standing unit that is generally rectangular in shape. In other embodiments, the housing may comprise a slant-top, bar-top, or table-top style cabinet. Of course, housings of various sizes and shapes may be used in different embodiments of the EGM 100.

The EGM 100 may further include a game display 104 integrated with the housing 102 and that is operable to present the one or more games of chance or skill described above. In one embodiment, the game display 104 includes a display, such as but not limited to, liquid crystal or plasma displays. The game display 104 may also include a touch screen or touch glass system. Thus, the game display 104 may be configured to display a variety of information to a player engaging the EGM 100 and simultaneously act as a user interface. In one embodiment, multimedia (e.g., graphics, video, audio, animation, and/or other audiovisual content) may be presented via the game display 104 (with the assistance of speakers or other audio output devices, if appropriate) to thereby provide the player with an enhanced, enjoyable, and entertaining gaming experience.

The EGM 100 may further include a variety of other user interfaces via which a player may interact with the EGM 100. As illustrated, a plurality of player-activated buttons 106 may be provided on a shelf of the housing 102. In one embodiment, a player interaction system 108 may also be provided at the top of the housing 102. This player interaction system 108 may include a graphics display 110, a touch bezel 112, a keypad 114, a player club card reader 116, and a card reader bezel 118.

The graphics display 110 may display a variety of information (including multimedia) to a player (or other user), and may be configured similarly to the game display 104 described above. In one embodiment, the graphics display 110 may display advertisements targeted to a player of the EGM 100 and/or may provide information regarding gaming rewards available to the player of the EGM 100. The touch bezel 112 associated with the graphics display 110 and the keypad 114 may comprise user interfaces via which a player may enter information into or otherwise interact with the EGM 100, and more specifically with the player interaction system 108.

In one embodiment, the player club card reader 116 may be configured to read information indicative of a player identity from any of a variety of player club cards issued by a gaming property associated with the EGM 100. The player club card reader 116 may also be configured to read gaming property employee cards, smart cards, and the like. Thus, the player club card reader 116 may enable a gaming property to monitor and track player and employee activity each time a player or employee inserts his or her card into the player club card reader 116. Moreover, the information indicative of the player identity read by the player club card reader 116 may be used to personalize game offerings, advertisements, rewards and/or marketing information displayed on the game display 104 or the graphics display 110.

The EGM 100 may further include a voucher printer (not visible) that prints to and then dispenses vouchers via a voucher slot 120. The voucher printer may comprise any of a variety of printers configured to encode vouchers that may be redeemed by a player. Of course, in other embodiments, other mechanisms for paying out players may be provided, including a coin hopper, a bill dispenser, a device for electronic funds transfer, etc.

During operation, a player may purchase credits on the EGM 100 in order to play the offered games using any of a variety of payment options (e.g., bills, coins, credit cards, player accounts at the gaming property, etc.). The EGM 100 may, for example, include a variety of mechanisms for accepting currency, including a bill acceptor, a credit/debit card acceptor, a coin slot, etc. In another embodiment, the EGM 100 may enable a player to transfer money from a player's account to the EGM 100 based at least in part on information indicative of the player's identity read by the player club card reader 116.

For each game play (e.g., a virtual spin of a wheel game), the player may place a wager at the EGM 100. Upon acceptance of the wager, the wagered amount may be subtracted from the credits associated with the player on the EGM 100. Depending upon the outcome of the game, the player may then win additional credits or may lose the amount of the wager.

The EGM 100 may also communicate in the background with one or more gaming servers via a network (not shown). In one embodiment, the EGM 100 may authenticate itself as well as software executed thereon before exchanging information with a gaming server. In another embodiment, the EGM 100 may exchange transaction information indicative of monies paid to or received from a player with a gaming server. In another embodiment, the EGM 100 may receive new software or updated versions of existing software (e.g., new games of chance, or a new version of an operating system) from a gaming server.

In one embodiment, the EGM 100 may carry out a variety of other tasks in the background. It may be desirable to execute many of these tasks in the background, such that a player interacting with the EGM 100 is unaware of them. In one embodiment, the EGM 100 may periodically run security checks on software stored in the EGM 100. For example, the EGM 100 may execute a hash function on the stored software to generate a hash value that may then be compared against an expected hash value. A difference between the hash values may indicate that the stored software has been corrupted. In another embodiment, the EGM 100 may store information indicative of the wagers made thereon. Such information may further be associated with a player identity read by the player club card reader 116 and may be periodically forwarded to a gaming server. In yet another embodiment, the EGM 100 may have a plurality of timers running, which may be used to schedule different tasks (e.g., time-sensitive tasks that will be described in further detail below).

Figure 2:
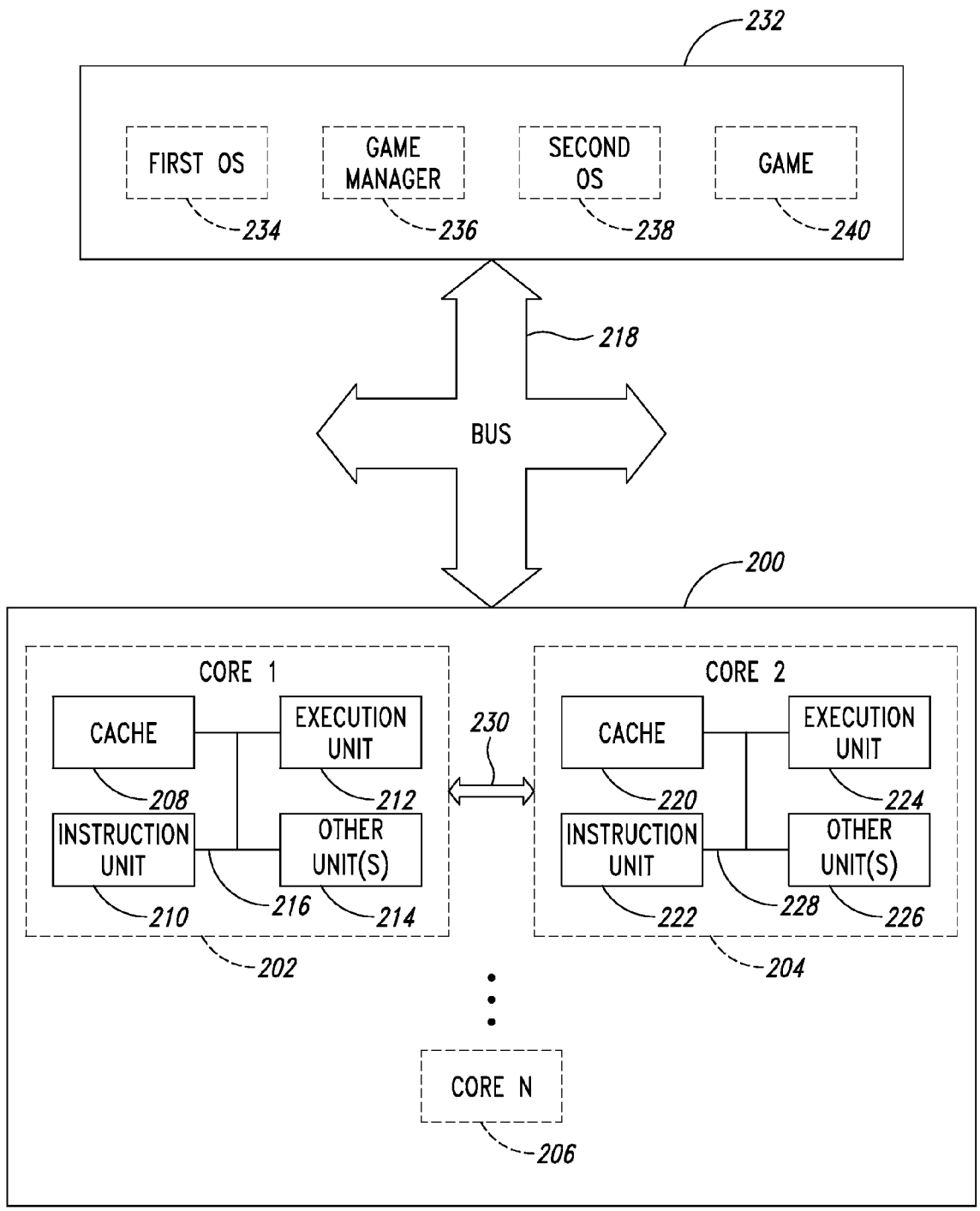
FIG. 2 is a block diagram showing one embodiment of a multi-core processor that can be implemented in the EGM of FIG. 1.

FIG. 2 is a block diagram showing one embodiment of a multi-core processor 200 that can be implemented in the EGM 100 of FIG. 1. Examples of multi-core processors that can be implemented as the multi-core processor 200 in the EGM 100 include products from Intel Corporation, AMD, IBM, Sun Microsystems, Inc., Hewlett-Packard Company, and others.

The multi-core processor 200 includes a plurality of processor cores: a first processor core 202, a second processor core 204, etc. up to an nth processor core 206. For the sake of simplicity of explanation hereinafter, the multi-core processor 200 will be described in the context of a dual-core processor having just the first processor core 202 and the second processor core 204. In one embodiment, the first processor core 202 and the second processor core 204 are formed on the same semiconductor substrate, thereby enabling a single integrated circuit to include both of these processor cores.

The first processor core 202 of one embodiment includes a cache (or other processor-readable storage medium) 208, an instruction unit 210, an execution unit 212, and other unit(s) 214. These elements are coupled to each other by a bus 216.

The cache 208 is adapted to store data or processor-executable instructions, such as operating system instructions, game manager instructions, or other instructions that are to be executed. For example, if an operating system or software application (located externally of the first processor core 202) is to be run/executed, the instructions of such operating system or software application is retrieved ("fetched") and stored in the cache 208.

The instruction unit 210 is adapted to fetch the instructions for storage in the cache 208 and to order/re-order or otherwise identify stored instructions from the cache 208 that are to be executed by the execution unit 212. The instruction unit 210 may also break up large instructions into smaller instructions and/or perform other operations pertaining to preparing instructions for execution.

The execution unit 212 is adapted to execute the instructions that are identified by the instruction unit 210. The execution unit 212 may use pipeline execution, out-of-order execution, sequential execution, and/or other execution/processing technique.

The other unit(s) 214 can include other units associated with operation of the first processor core 202, such as an interface to components (e.g., a system bus 218) external to the first processor core 202, an interface between internal components within the first processor core 202, one or more buffers, and/or other elements and sub-elements of the first processor core 202 that need not be described in further detail herein.

In a manner generally similar to the first processor core 202, the second processor core 204 includes a cache 220, an instruction unit 222, an execution unit 224, and other unit(s) 226, which are coupled together by a bus 228. For the sake of brevity, these elements of the second processor core will not be described in further detail herein, since similar elements have already been described above with respect to the first processor core 202.

An arrow 230 between the first processor core 202 and the second processor core 204 symbolically represents, in one embodiment, interaction between these processor cores. For example, there may be conditions/dependencies associated with the data or execution of instructions by the first processor core 202 that may affect the data or execution of instructions by the second processor core 204, and vice versa. There may also be synchronization requirements in some instances. As such, the arrow 230 represents that the internal components of each of the two processor cores can communicate directly with each other (for example, the execution unit 224 of the second processor core 204 might use data stored in the cache 208 of the first processor core 202). The arrow 230 can also represent that the internal components of the two processor cores can communicate with each other indirectly, such as via the system bus 218 and other external components.

In one embodiment, the first processor core 202 is adapted to operate independently of the second processor core 204, and vice versa. In such an embodiment, direct or indirect interaction between these two processor cores, as indicated by the arrow 230, may be significantly reduced or even non-existent.

The system bus 218 couples the multi-core processor 200 to at least one processor-readable storage medium, such as a memory 232. The memory 232 can include for example system memory adapted to store processor-executable instructions that are executable by the first processor core 202 and by the second processor core 204 of the multi-core processor 200.

Further details of the memory 232 and its features and contents will be provided later below with respect to FIG. 3. However, with respect to FIG. 2 and the description of the multi-core processor 200, the contents of the memory are now provided herewith.

In one embodiment, the memory 232 stores a first operating system 234 associated with and executable by the first processor core 202. The operating system 234 can be adapted to control various operations of the EGM 100 that may not necessarily pertain to game play. For example, the operating system 234 may be responsible for the management and coordination of activities and the sharing of the resources of the EGM 100, including controlling the operation of hardware. The operating system 234 can control/manage operation of input/output devices, peripheral devices, communications, accounting, power management, security, and so forth. The operating system 234 can also be used to set and implement hardware and software configuration settings of the EGM 100.

Examples of the first operating system 234 include a real-time operating system, such as Linux, VxWorks, QnX, and so forth. Other types of operating systems may be used as the first operating system 234. Any of a number of real-time applications subject to time-sensitive conditions as well as other applications may be executed by the first operating system 234. In one embodiment, network applications configured to enable communication between the EGM 100 and at least one gaming server may be executed by the first operating system 234. Such network applications may require time-sensitive responses to network inquiries. In another embodiment, security applications that validate software stored on the EGM 100 may also be executed by the first operating system 234. In yet another embodiment, currency applications that receive and process information indicative of currency inserted into the EGM 100 (e.g., via currency acceptor) may be executed by the first operating system 234. Such currency applications may also be subject to time-sensitive constraints when responding to these financial transactions.

Included with or in cooperation with the first operating system 234 in the memory 232 is one embodiment of a game manager 236. The game manager 236 can be embodied as a software application or other processor-executable instructions executable by the first processor core 202. In one embodiment, the game manager 236 is also adapted to control various operations of the EGM 100 that pertain to a game. For example, the game manager 236 can be adapted to launch or deactivate a game, provide updates (such as feature or version updates) to a game, set parameters (such as audio volume, currency denomination, reel speed, display brightness, minimum bet, maximum bet, jackpot amount, bets-per-line, number of available lines, game theme, and other configuration settings) of a game, run security checks, and manage wagers (including payouts and other accounting) associated with a game, and other aspects of a game.

In one embodiment, the game manager 236 is a separate element from the first operating system 234 but operates in cooperation with the first operating system 234. In another embodiment, certain features or tasks of the first operating system 234 and the game manager 236 may be combined or shared, such that the game manager 236 can be considered as being part of the first operating system 234.

In one embodiment, the memory 232 may store at least a second operating system 238 associated with and executable by the second processor core 204. The second operating system 238 can be an operating system that might be more "multimedia friendly" than the first operating system 234. One example of the second operating system 238 can include Microsoft Windows. In another embodiment, the second operating system 238 can be the same type of operating system as the first operating system 234, such as a Linux-based operating system.

The memory 232 may also store one or more games 240, which in one embodiment can be in the form of a software application or other processor-executable instructions executable by the second processor core 204. In one embodiment, the playing of the game 240 may involve an extensive multimedia presentation (e.g., graphics, audio, video, animation, etc.). As such, one embodiment dedicates the second operating system 238 (which is "multimedia friendly) to support or otherwise control/manage the playing of the game 240, both of which are executed by or on the second processor core 204. For example, the second processor core 204 of one embodiment is adapted to execute the second operating system 238 and the game 240 to present game-oriented outcome and results as the game is played, along with the accompanying background audiovisual multimedia content.

In one embodiment, since the first processor core 202 and the second processor core 204 are adapted to operate independently of each other, changes to the first operating system 234 do not affect or minimally affect the playing or performance of the game 240 on the second processor core 204. Various other changes to the respective elements (e.g., the operating system, application, etc.) associated with each processor core do not affect or minimally affect the other processor core, in the various embodiments where the two processor cores operate independently of each other.

Thus, for example, even if the second operating system 238 is executing a particularly graphics-intensive game 240, the bandwidth and resources available to real-time applications being run by the first operating system 234 will be substantially unaffected. Moreover, applications executed by the first operating system 234 that should not be accessible to players of the EGM 100 may be kept isolated from the interactive applications provided via the second operating system 238.

Further by providing the multiple processor cores, the workload of the EGM 100 can be divided up and completed faster. In one embodiment, the first processor core 202 and/or the second processor core 204 has a slower speed relative to a single larger processor of conventional EGMs. Use of these slower and smaller processor cores, in combination with placement of these smaller processor cores on a single IC, reduces the problems pertaining to size and heat that are encountered with the conventional larger processors. For example, the distance that data travels within the first processor core 202 and/or within the second processor core 204 is shorter, as compared to the distance within a larger single processor, thereby resulting in a heat reduction.

In one embodiment, the allocation of tasks to be performed by the first processor core 202 versus the second processor core 204 can be time-based. For example, the first processor core 202 can be adapted to execute first processor-executable instructions associated with first tasks that are more time-sensitive relative to second tasks that are associated with second-computer readable instructions, wherein the second processor core 204 is adapted to execute the second processor-executable instructions.

Examples of more time-sensitive tasks to be performed by the first processor core 202 can include management/control of configuration setting changes (e.g., changes in currency denomination, reel speed, game volume, display brightness, bets-per-line, number of available lines, content download, and so forth) that need to be performed on the EGM 100 on a per minute, hour, daily, weekly, etc. basis. Further details of such time-based configuration setting changes are disclosed in U.S. patent application Ser. No. 12/112,473, entitled "METHOD, SYSTEM, APPARATUS, AND ARTICLE OF MANUFACTURE FOR PROFILE-DRIVEN CONFIGURATION FOR ELECTRONIC GAMING MACHINES (EGMS)," filed Apr. 30, 2008, assigned to the same assignee as the present application, and incorporated herein by reference in its entirety.

Other examples of time-sensitive tasks that can be performed by the first processor core 202 may include, but not be limited to, running security checks or authentication on software installed in the EGM 100 according to a time schedule, polling a back-end server for software upgrades or changes according to a time schedule, communicating accounting information with a back-end accounting system according to a time schedule, and so forth.

In one embodiment, such time-sensitive tasks that can be performed by the first processor core 202 are separate from and independent of the tasks associated with playing the game 240. For example, performing authentication (such as for instance to detect hacking or a virus) on the software of the game 240 according to a time schedule may be performed in a background process that is transparent to the player, such that the player is unaware of the authentication being performed as the player is engaged in the playing of the game 240.

In another embodiment, the time-sensitive tasks that can be performed by the first processor core 202 may involve elements of the playing of the game 240 itself. For instance, responding to player wagers or other player input, in order to cause the game 240 to deal a hand of virtual player cards or to spin a virtual slot machine, can be thought of as a time-sensitive task since such responses need to be performed quickly after player input has been received, in order to maintain the flow of the game. Accordingly, such time-sensitive tasks can be allocated to the first processor core 202, while other aspects of the game play that are less time-sensitive (such as displaying a graphical representation of the winning hand, presenting a graphical representation of the current bet or of the odds, presenting the game theme, etc.) can be allocated to the second processor core 204. In such embodiments therefore, all of the operations of the game manager 236, the game 240, etc. stored in the memory 232 need not necessarily be allocated for processing by just an individual one of the processor cores—different operations of the game 240 itself (for example) can be distributed between the processor cores.

In one embodiment, the less time-sensitive tasks that can be performed by the second processor core 204 can include at least some aspects of the multimedia presentation associated with game play, such as the graphical representations noted above. Of course, the embodiments do not limit the second processor core 204 to just less time-sensitive tasks and/or to just game play. In other embodiments, the second processor core 204 can perform tasks that are just as time-sensitive as (or even more time-sensitive than) the tasks performed by the first processor core 202. Moreover in some embodiments, the second processor core 202 may perform tasks additionally or alternatively to just tasks associated with game play.

What constitutes a task as being time-sensitive or not time-sensitive can be determined or configured by a user (such as a system administrator or game property staff member). For example, certain tasks that need to be performed according to a strict time schedule (whether every second or less, every minute, every hour, every day at a certain time, etc.) can be deemed to be "time-sensitive" and programmed as such into the first core processor 202. As yet another example, "time-sensitive" tasks can be those tasks that need to be performed as soon as possible if a certain condition occurs. For instance, a time-sensitive task can include generating a player's virtual hand, once the EGM 100 detects that the player has submitted a wager. Still further, a time-sensitive task can include shutdown of the EGM 100 upon detection of a hacking attack or other condition.

The above-described examples provide illustrations as to how certain tasks may be allocated between the first processor core 202 and the second processor core 204, depending on factors such as time-sensitivity, game play and multimedia presentation tasks versus non-game-play tasks, etc. Other criteria for allocating certain tasks to one processor core instead of the other processor core(s) may be used, and additional examples of allocations that may be used in other embodiments are disclosed in U.S. patent application Ser. No. 12/113,021, entitled "VIRTUALIZATION FOR GAMING DEVICES," filed Apr. 30, 2008, assigned to the same assignee as the present application, and incorporated herein by reference in its entirety.

As used herein, the term "time-sensitive" is a general term referring to a requirement that an application, operating system, and/or related task respond in accordance with relatively tight operational deadlines from the occurrence of an event, to the response to the event. By contrast, an application, operating system, and/or related task that is not time-sensitive or is less time-sensitive is typically not associated with particular deadlines, even if fast response or high performance may be desirable.

Figure 3:
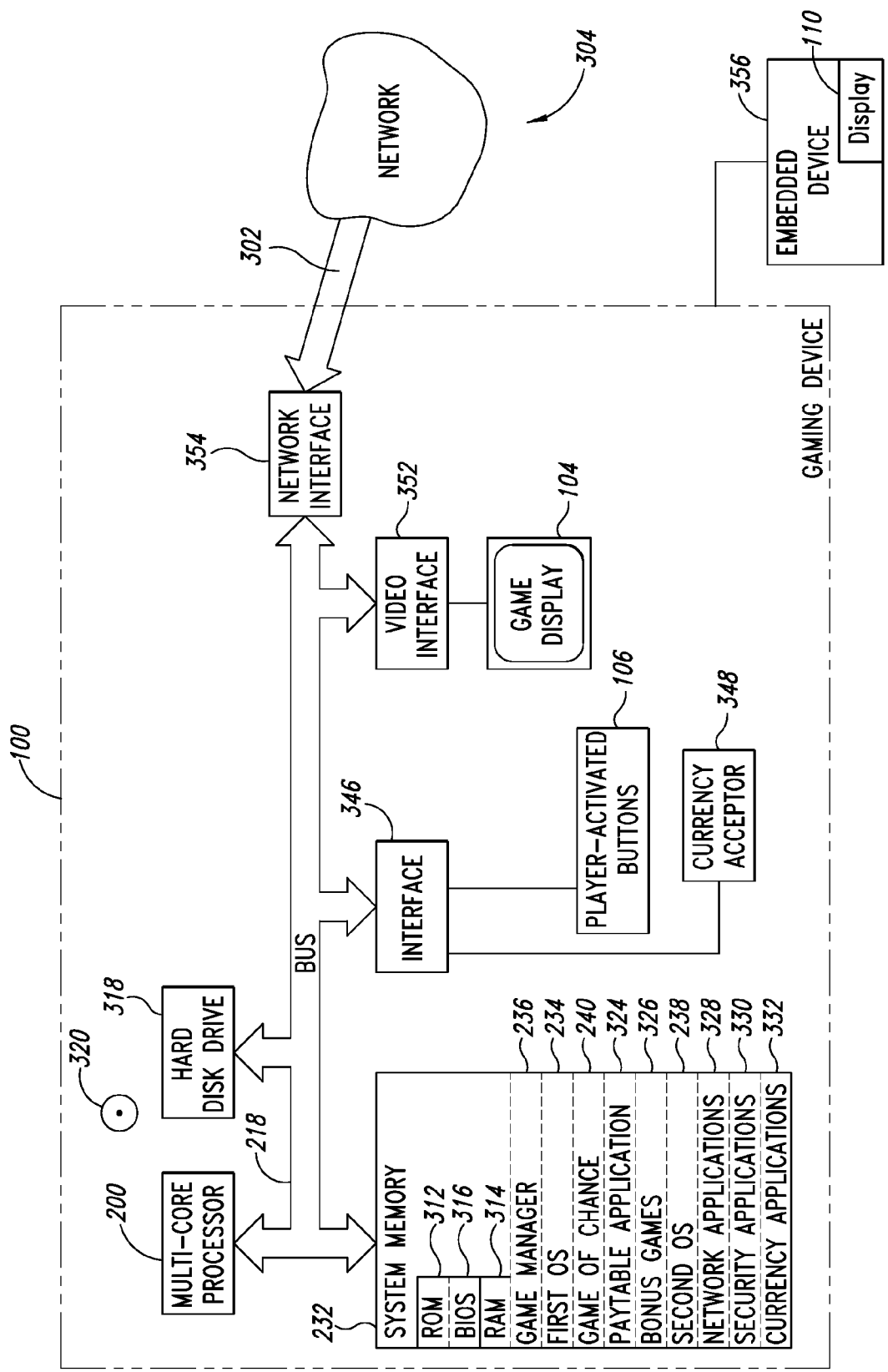
FIG. 3 is a schematic drawing showing the elements of one embodiment of the EGM of FIG. 1 in more detail.

With reference to FIG. 3, the internal structure of one embodiment of the EGM 100 having the multi-core processor 200 may be described in greater detail. Although not required, the embodiments will be described in the general context of computer-executable instructions, such as program application modules, objects, or macros being executed by a computer. The embodiments can be practiced in distributed computing environments where some tasks or modules are performed by remote processing devices, which are linked through a communications network. In a distributed computing environment, program modules may be located in both local and remote memory storage devices.

The EGM 100 may be coupled by at least one communication channel/logical connection 302 to a network 304. Thus, in one embodiment, the EGM 100 may be communicatively coupled with other EGMs and/or with one or more gaming servers within the gaming property.

The EGM 100 may have an internal configuration that includes the multi-core processor 200 described above, the memory 232, and the system bus 218 that couples various system components together.

The system bus 218 can employ any suitable bus structure or architecture, including a memory bus with memory controller, a peripheral bus, and a local bus. The memory 232 includes read-only memory (ROM) 312 and random access memory (RAM) 314. A basic input/output system (BIOS) 316, which can form part of the ROM 312, contains basic routines that help transfer information between elements within the EGM 100, such as during start-up.

The EGM 100 may also include a hard disk drive 318 for reading from and writing to a hard disk 320. The hard disk drive 318 may communicate with the multi-core processor 200 via the system bus 218. The hard disk drive 318 may also include an interface or controller (not shown) coupled between it and the system bus 218. The hard disk drive 318 provides nonvolatile storage for processor-executable instructions, data structures, program modules and other data for the EGM 100. Although the depicted EGM 100 employs a hard disk 320, other types of processor-readable media that can store data accessible by a computer may be employed, such as magnetic cassettes, flash memory cards, RAMs, ROMs, smart cards, optical disks, etc.

Program modules can be stored in the memory 232, such as the game manager 236 described above, the first operating system 234, and the second operating system 238. As explained previously above, the game 240 may be executable by the second operating system 238 via the second processor core 204. Additional games 326 (including bonus games) may be provided for execution by the second operating system 238 via the second processor core 204.

There may be other applications stored in the memory 232, including a paytable application 324, network application(s) 328, security application(s) 330, and currency application(s) 332. Such applications may be executed by the first processor core 202 and/or by the second processor core 204. While shown in FIG. 3 as being stored in the memory 232, the game manager 236, the first operating system 234, the second operating system 238, the games 240 and 326, and the various applications can be stored on the hard disk 320 of the hard disk drive 318.

A player can interact with the EGM 100 through user interfaces such as the player-activated buttons 106. Other user interfaces for receiving user input can include a touch-sensitive display, the touch-sensitive bezel 112, joystick, game pad, tablet, etc. These and other user interfaces may be coupled to the multi-core processor through an interface 346 such as a universal serial bus ("USB") interface that couples to the system bus 218, although other interfaces such as a parallel port, a game port or a wireless interface or a serial port may be used.

The interface 346 may further be coupled to a currency acceptor 348 configured to accept currency from a player. In one embodiment, the currency acceptor 348 may include one or more coin slots, bill acceptors, etc. In another embodiment, the EGM 100 may include a card slot for receiving a financial card issued by a financial institution (e.g., a credit/debit card), via which credits may be purchased.

In one embodiment, as illustrated, an embedded device 356 may also be coupled to the EGM 100 via an interface (e.g., via the interface 346). The embedded device 356 may comprise a logically separate computing device including its own processing unit, memory, bus, etc. This embedded device 356 may have relatively limited computational resources and may run an operating system having a relatively small footprint, such as Microsoft Windows CE. In one embodiment, the embedded device 356 may provide the functionality described above with regards to the player interaction system 108. In particular, the embedded device 356 may be communicatively coupled to the player club card reader 116 and may control the graphics display 110. As described above, the graphics display 110 may display marketing, advertising, rewards and other information to a player.

The game display 104 and other display devices may be coupled to the system bus 218 via a video interface 352, such as a video adapter.

The EGM 100 may operate in a networked environment using one or more logical connections 302 to communicate with one or more remote computers, gaming servers and/or other EGMs through the network 304. These logical connections may facilitate any suitable method of permitting computers to communicate, such as through one or more LANs and/or WANs, such as the Internet. Such networking environments are well known in wired and wireless enterprise-wide computer networks, intranets, extranets, and the Internet.

In one embodiment, the network interface 354 (communicatively linked to the system bus 218) may be used for establishing communications over the logical connection 302. In a networked environment, certain software modules can be stored outside of the EGM 100 (not shown). The network connections shown in FIG. 3 are only some examples of ways of establishing communications between computing devices, and other connections may be used.

Figure 4:
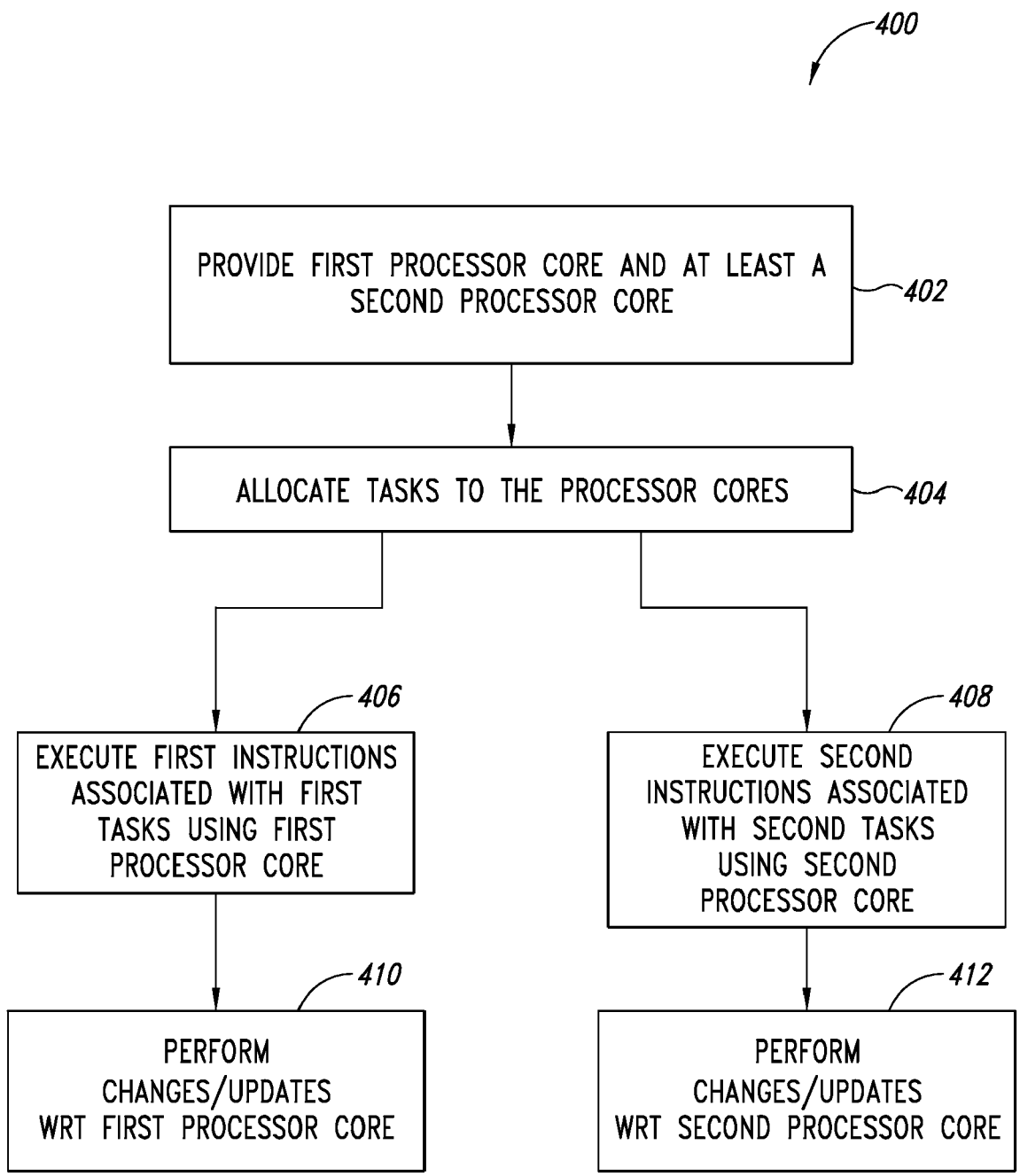
FIG. 4 is a flowchart of one embodiment of a method to operate the EGM of FIG. 1 using the multi-core processor of FIG. 2.

FIG. 4 is a flowchart of a method 400 to operate the EGM 100 using the multi-core processor 200, according to one embodiment. In one embodiment, at least some operations depicted in the method 400 can be implemented via software or other processor-executable instructions stored on a processor-readable medium (such as the memory 232) and executable by the first processor core 202 and/or by the second processor core 204. Moreover, the various operations depicted in the method 500 need not necessarily occur in the exact order shown. Various operations can be added, removed, modified, or combined in certain embodiments.

At a block 402, the method 400 provides the EGM 100 with one or more of the multi-core processor 200, which has the first processor core 202 and at least one second processor core 204 such as described above.

At a block 404, the method 400 allocates certain tasks to each of the processor cores. Allocation of tasks can be performed programmatically in one embodiment, for example by having a system administrator configure or otherwise program the EGM 100 to designate which tasks are to be performed by the first processor core 202 and by the second processor core 204. This task allocation can be performed at a higher level, for example by having the system administrator designate which application programs are to be run entirely by the first processor core 202, and which other application programs are to be run entirely by the second processor core 204. In a more granular level of task allocations, certain tasks (which may comprise only a portion of the total functionality or total number of tasks of a particular application program) can be allocated to the first processor core 202, while other tasks of the same application program can be allocated to the second processor core 204. In a still further granular level of task allocation, even individual instructions or instruction sets can be allocated between the two processor cores.

Blocks 406 and 408 respectively depict the separate execution of instructions associated with tasks using the first processor core 202 and the second processor core 204. The execution of these instructions can be performed independently of each other in one embodiment, since the first processor core 202 and the second processor core 204 are adapted to operate independently.

In other embodiments, there may be some dependency between the respective executions and/or some sharing of resources or data. In such embodiments, the first processor core 202 and the second processor core 204 are still nevertheless adapted to operate substantially independently, since most of their tasks (e.g., greater than 50 percent) may not require dependency, sharing, synchronization, etc.

Blocks 410 and 412 respectively represent the capability to perform changes/updates with respect to the first processor core 202 and the second processor core 204, independently of each other. For example and as previously described above, changes to the first operating system 234 (which is run on the first processor core 202) need not necessarily affect the playing of the game 240 (which is run on the second processor core 204). Similarly, changes to the second operating system 238 (which is run on the second processor core 204) need not necessarily affect the first operating system 234 and/or the game manager 236 (which are run on the first processor core 202).

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in integrated circuits, as one or more programs executed by one or more processor cores, as one or more programs executed by one or more controllers (e.g., microcontrollers), as firmware, or as virtually any combination thereof.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), and a portable compact disc read-only memory (CDROM). Note that the processor-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An electronic gaming machine (EGM) apparatus, comprising:
   at least one processor-readable storage medium that stores:
      a set of processor-executable game instructions that implement a game;
      a set of processor-executable game manager instructions that implement a game manager; and
      a first set of processor-executable operating system instructions that implement a first operating system; and
   a multi-core processor that includes:
      a first processor core adapted to execute said game manager instructions and said first set of operating system instructions, wherein said game manager instructions cause the game manager to perform each of: launch said game, provide updates to said game, set parameters of said game, and manage wagers associated with said game;
      a second processor core adapted to execute said game instructions, said game manager instructions being more time-sensitive relative to said game instructions and wherein said game instructions cause second processor to execute play of said game, including presentation of multimedia content during said play of game;
      a semiconductor substrate on which said first and said second processor cores are formed; and
      a display coupled to said multi-core processor adapted to display results of execution by said second processor core.

2. The EGM apparatus of claim 1 wherein said multi-core processor is a dual-core processor.

3. The EGM apparatus of claim 1 wherein said at least one processor-readable medium stores a second set of processor-executable operating system instructions that implement a second operating system and that are adapted to also be executed by said second processor core.

4. The EGM apparatus of claim 1 wherein said game is unaffected by modification to said first operating system.

5. The EGM apparatus of claim 1, further comprising a system bus coupled between said at least one processor-readable storage medium and said multi-core processor to enable interaction therebetween.

6. A method of operating an electronic gaming machine (EGM) having a multi-core processor, the method comprising:
- allocating first tasks to be executed by a first processor core of said multi-core processor;
- allocating second tasks to be executed by at least a second processor core of said multi-core processor, said first tasks being more time-sensitive relative to said second tasks;
- executing said first tasks by said first processor core, wherein said executing said first tasks includes launching a game of the EGM by said first processor core, providing updates to said game, setting parameters of said game, and managing wagers associated with said games; and
- executing, substantially independently of said execution by said first processor core, said second tasks by said second processor core, wherein said executing said second tasks includes playing said game by said second processor core.

7. The method of claim 6, further comprising providing a separate operating system for each of said first and second processor cores.

8. The method of claim 6 wherein said executing said second tasks includes running a multimedia presentation of a game by said second processor core.

9. A system, comprising:
an electronic gaming machine (EGM);
a multi-core processor coupled to said EGM and including:
- a first processor core that executes first tasks of the EGM, wherein said first tasks include each of: launch a game of said EGM, execute a security check, perform a configuration setting, manage wagers, and perform an update;
- at least a second processor core that executes second tasks of the EGM, said first tasks being more time-sensitive relative to said second tasks, and wherein said second tasks include play of a game of said EGM, including presentation of multimedia content during said play of said game; and
- a semiconductor substrate on which said first and second processor cores are formed; and
a display coupled to said multi-core processor and to said EGM and adapted to display results of execution by said second processor core.

10. The system of claim 9 wherein said multi-core processor and said display are integrated with a housing of said EGM.

11. The system of claim 9 wherein said EGM, said multi-core processor, and said display form parts of a distributed system in which said multi-core processor is located at a server remote from said EGM.

12. The system of claim 9, further comprising at least one processor-readable storage medium adapted to store a plurality of operating systems respectively associated with and respectively adapted to be executed by said first processor core and by said second processor core.

13. The system of claim 9 wherein said first and said second processor cores are independent of each other such that changes with respect to said first processor core do not affect said second processor core.

* * * * *